Dec. 31, 1963  R. D. VAN AUKEN  3,115,911
GUIDE APPARATUS FOR HOLE SAWS
Filed Sept. 10, 1962  2 Sheets-Sheet 1
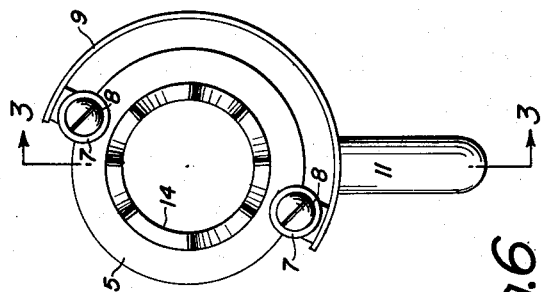
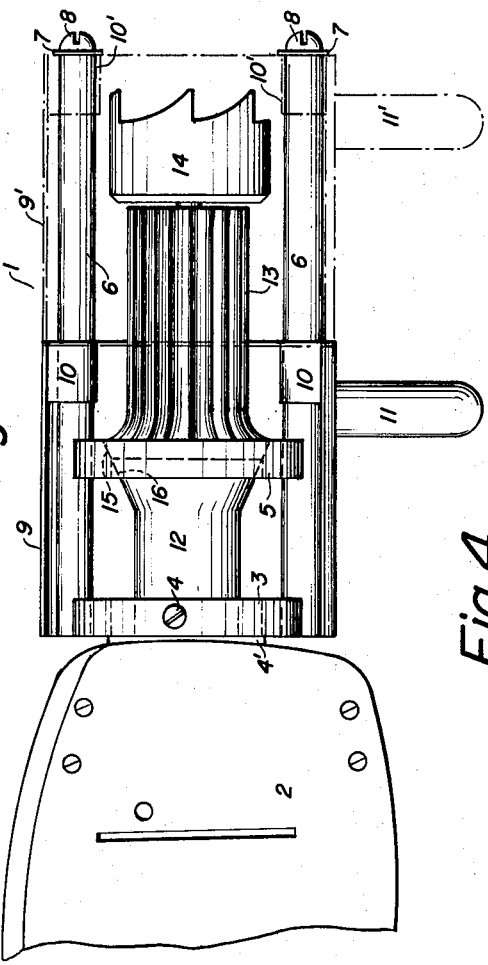
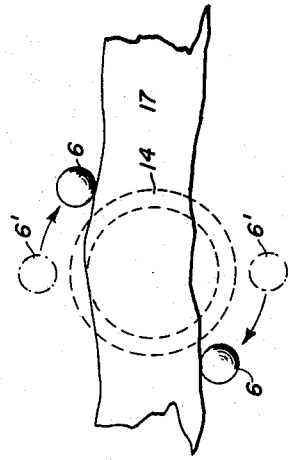
INVENTOR
Robert D. Van Auken
BY
ATTORNEY INVENTOR
Robert D. Van Auken

BY
ATTORNEY

United States Patent Office 3,115,911
Patented Dec. 31, 1963

3,115,911
GUIDE APPARATUS FOR HOLE SAWS
Robert D. Van Auken, 426 E. North St., Bethlehem, Pa.
Filed Sept. 10, 1962, Ser. No. 222,359
17 Claims. (Cl. 143—85)

This invention relates generally to saw apparatus and particularly to saw apparatus comprising a hole saw and guide means associated therewith and adapted to engage opposite sides of the member being cut, the said guide means when engaged with the opposite sides of the member being cut preventing the hole saw from wandering.

My invention finds particular utility in pruning trees and the like, permitting the operator, with the preferred embodiment of the invention, to use a standard portable electric drill with the guide means secured thereto as an attachment or accessory to prune the desired branch and also to smooth off and finish the remaining stump of the branch.

However, my invention is not limited to use in pruning operations, but also finds considerable utility in cutting off or drilling holes through members of various sizes, including structural 2 x 4's and the like.

Briefly, my invention in the preferred embodiment comprises, in combination with a rotatable hole saw, two guide rods arranged on opposite sides of the rotating hole saw and extending parallel thereto, the said guide rods being fixed as to the portable electric drill which rotates the hole saw and extending beyond the front cutting sursurface of the hole saw. The said guide rods are spaced from each other by a distance greater than the largest size member that the apparatus is intended to cut. In operation, the apparatus is placed with the hole saw adjacent the member to be cut, the guide rods straddling opposite sides of the said member. The apparatus is then rotated about the axis of the hole saw, causing the guide rods to engage the opposite sides of the member to be cut, the engagement of the guide rods with the member providing a secure grip to steady the hole saw and prevent the same from drifting or wandering. As the hole saw is advanced to deepen and complete the cut, the guide rods which are in engagement with the opposite sides of the member being cut slide over the member in a direction parallel to the direction of advancement of the hole saw, the said guide rods continuing to provide the same steady grip throughout the cutting operation.

One of the objects of my invention is to provide a saw apparatus comprising a rotating hole saw and rod-like guide means associated therewith, the latter engaging opposite sides of the member being cut and thereby steadying the hole saw and preventing the same from drifting or wandering.

Another object of my invention is to provide a saw apparatus comprising a rotating hole saw and rod-like guide means associated therewith, the latter engaging opposite sides of the member being cut and being adapted to slide along the member in a direction parallel to the direction of advancement of the hole saw and steadying the hole saw continuously as the cut is deepened.

A further object of my invention is to provide a saw apparatus comprising a rotating hole saw and rod-like guide means associated therewith, the said rod-like guide means being telescopically adjustable thereby to permit a wider range of use.

Yet another object of my invention is to provide a saw apparatus comprising a rotating hole saw and rod-like guide means associated therewith, one or both of said rod-like guide means having additional guide means at the free ends thereof, which latter guide means is rotatable towards the other rod-like guide means permitting the hole saw to be steadied while making end cuts of dimension less than the clear distance between the rod-like guide means.

Other and further objects of my invention will become apparent during the course of the following description, reference being made to the accompanying drawings in which like numerals represent like parts in the several views.

FIGURE 1 represents a side view in elevation, showing the apparatus with the safety cover and front hand support in solid lines in the fully retracted position, the phantom lines indicating the safety cover and front hand support in the fully extended position.

FIGURE 2 represents an end view in elevation, as seen from the right of FIGURE 1, with the electric drill omitted for purposes of clarity.

FIGURE 4 (Sheet 1) represents diagrammatically the relation of the guide rods to the member being cut, showing the said guide rods in solid lines in engagement with the opposite sides of the member after the apparatus has been rotated, and showing the guide rods in phantom as the apparatus is first introduced to the member and before the same is rotated.

FIGURE 6 represents an end view in elevation generally similar to FIGURE 2 and partially diagrammatic, showing another modification of my invention wherein at least one of the guide rods has a rotatable member secured thereto to permit the hole saw, indicated in phantom, to be steadied against wandering or drifting even when making cuts which are of less dimension than the clear distance between the two guide rods.

Figure 7:
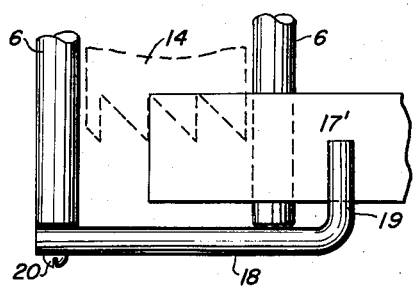

FIGURE 7 represents a view in plan of the modification shown in FIGURE 6, the hole saw being indicated in phantom.

Figure 3:
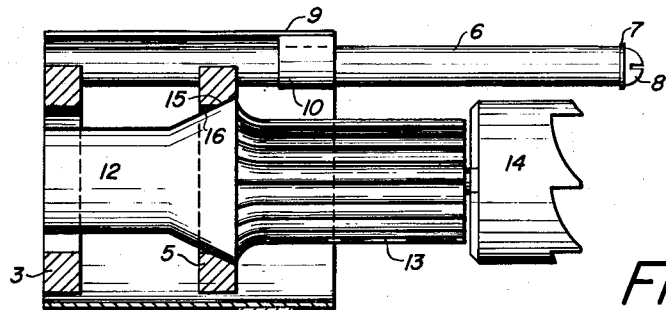
FIGURE 3 represents a vertical section in elevation taken along the line 3—3 of FIGURE 2, showing the apparatus with the electric drill omitted for purposes of clarity.

Guide apparatus 1 is associated preferably with portable electric drill 2 and, as shown in FIGURES 1–3, comprises spaced rings 3 and 5, with spaced parallel guide rods 6 secured thereto by any suitable means such as welding.

The particular portable electric drill 2 shown in FIGURE 1 is provided with a boss 4'. Ring 3 fits over boss 4' and is secured thereto by set screw 4 and, in this manner, guide apparatus 1 and electric drill 2 are secured together. Other types of electric drills may lack the boss 4' and other means of securing the guide apparatus 1 to the electric drill 2 will occur to those familiar with the art, the precise manner of securing the guide apparatus 1 to the electric drill 2 as shown herein not being an essential feature of the invention. Moreover, the guide apparatus 1 may be formed integrally with any means for holding and rotating the cutting mechanism guided by the side guide apparatus 1, and the invention is not to be considered as limited to use only with electric drills.

Guide rods 6 may be threaded internally at their free ends and washers 7 secured thereto by screws 8. Collars 10 are secured to safety cover 9 and are slidable along guide rods 6, the said washers 7 serving as stops for the collars 10 and safety cover 9 and preventing the same from inadvertently being removed from the guide apparatus 1. Front hand support 11 is secured to safety cover 9 and permits the operator to support the forward or front end of the assembled guide apparatus 1 and electric drill 2 as well as to reciprocate as required the safety cover 9 relative to the guide rods 2. The forwardmost positions of safety cover 9, collars 10 and front hand supports 11 being indicated in FIGURE 1 by the numerals 9', 10' and 11' respectively.

The particular hole saw shown in the drawings comprises base 12 which may be internally threaded and secured to the male threaded end of the shaft of the electric drill 2 (the Jacobs chuck usually associated with such portable electric drill being removed). Alternatively, a base 12 may be suitably proportioned so as to be held by a Jacobs chuck. Other means for securing base 12 to the shaft of the electric drill 2 are known to those familiar with the art and may also be used.

The particular hole saw shown in the drawings also comprises longitudinally fluted cutting portion 13 and hole cutting bit 14, the cutting portion 13 finding particular use in smoothing off and finishing stumps of trees after the branches have been pruned or cut off by the hole cutting bit 14. Conventional hole cutting saws with hole cutting bit 14 and without the cutting portion 13 may also be used with the present invention.

It is preferred to provide additional guide means as far forward in the direction of hole cutting bit 14 as possible, to take up side stresses in the hole saw, particularly when cutting portion 13 is used to smooth off stumps, and to prevent these side stresses from being introduced to the shaft of the electric drill 2 as otherwise the drill bearings may be damaged. Accordingly, ring 5 is provided with tapered seat 15 complementary to and rotatably receiving tapered portion 16 of the hole saw.

In operation, the hole cutting bit 14 is placed adjacent member 17 which is to be cut, guide rods 6 straddling the said member 17 and cover 9 being advanced towards the said member 17. The electric drill 2 and guide apparatus 1 are then rotated until the guide rods 6 engage opposite surfaces of the member 17, the electric drill 2 and guide apparatus 1 being maintained in this position. The guide rods 6 are indicated in FIGURE 4 by the numerals 6' in their initial straddling but unengaged position (before rotation), the unprimed numerals 6 indicating their position after they have been rotated to engagement with the member 17. The electric drill 2 may then be started, the engagement of the guide rods 6 with the opposite sides of the member 17 steadying the hole cutting bit 14 and preventing it from wandering or drifting, as the hole cutting bit 14 cuts into the member 17. Guide rods 6 remain in engagement with the opposite sides of member 17 and slide along the same in the direction of the cut, as the cutting bit 14 advances into the member 17, the said guide rods 6 continuing to provide a steadying influence on the hole cutting bit 14 and on the assembled electric drill 2 and guide apparatus 1, the safety cover 9 sliding backwardly on the said guide rods 6 as the cut is deepened.

It will be noted that the spacing of guide rods 6 permits a range of sizes of members 17 to be gripped thereby, the amount of rotation necessary to grip the member 17 being dependent upon the thickness of said member 17.

It will be further noted that, depending upon the relative sizes of hole cutting bit 14 and the member 17, the said member 17 may be completely severed by the hole saw, or the hole saw may simply drill a hole completely or partially through the member 17. In any event, the guide apparatus 1 with guide rods 6 functions in the same manner to steady the operation.

Additionally, it will be noted that safety cover 9 shields part of the cutting mechanism and thereby provides a certain margin of safety for the operator. In certain operations, particularly where cutting portion 13 is not part of the hole saw, safety cover 9, as well as front hand support 11, may be dispensed with.

As previously stated, if in a pruning operation it is desired to smooth off and finish the stump after hole cutting bit 14 has cut through and severed the branch, the assembled electric drill 2 and guide apparatus 1 may be shifted to bring cutting portion 13 into cutting engagement with the stump to finish the same. It will be apparent that the stump will be introduced to cutting portion 13 on that side opposite the safety cover 9.

Figure 5:
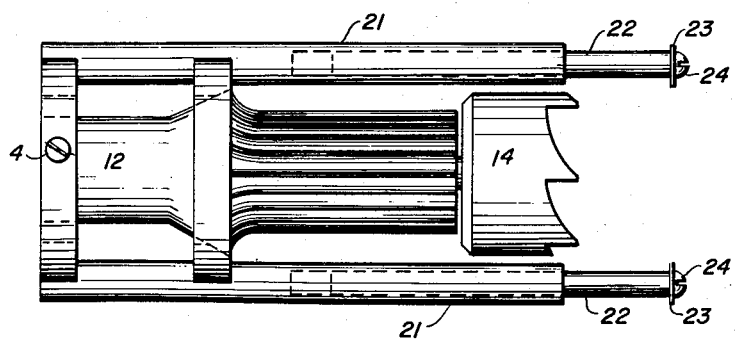
FIGURE 5 represents a side view in elevation generally similar to FIGURE 1, with the electric drill and safety cover omitted for purposes of clarity, showing a modification of the apparatus wherein the two guide rods are provided with telescopic extensions.

In the embodiment shown in FIGURE 5, guide rods 21 are provided with telescopic extensions 22, the latter being closely fitted in openings in the said guide rods 21 so as to be adjustable relative thereto. Extensions 22 may be internally threaded at their free ends, and washers 23 held thereto by means of screws 24, the said washers 23 serving as stops to prevent inadvertent removal of safety cover 9 (not shown for purposes of clarity in FIGURE 5) from the said guide rods 21 and extensions 22. Alternatively, springs (not shown) may be interposed between guide rods 21 and extensions 22, in the bores in guide rods 21, to urge the extensions 22 outwardly a limited amount, the said springs as well as means to limit the outward travel of extensions 22 under the influence of the springs being known to those familiar with the art and omitted from FIGURE 5 for purpose of clarity. This embodiment of my invention is used in the same manner as the previously described embodiment, providing additional leverage for steadying the apparatus and not interfering with the use of the apparatus in close quarters, the extension 22 retracting into the guide rods 21 (as the hole cutting bit 14 is advanced) when interfering structures are encountered.

The embodiment shown in FIGURES 6 and 7 is used to steady the hole cutting bit 14 when the latter is cutting member 17' adjacent the end thereof, it being apparent that if the clear distance between guide rods 6 is greater than the distance between the end of member 17' and the guide rod 6 closest to member 17', the said guide rods 6 cannot be rotated so that both engage opposite sides of said member 17'. For such operations, auxiliary guide member 18, preferably of length slightly greater than the clear distance between guide rods 6, is secured to one of the guide rods 6 by means of screw 20 (as shown in FIGURE 7) and may be rotated to the desired position (as shown in FIGURE 6) so as to engage one side member 17' while the other side is engaged by the other guide rod 6. Extension 19 is provided at the free end of auxiliary guide member 18, at an angle thereto, and projects rearwardly preferably to a point just behind the cutting plane of hole cutting bit 14. With this embodiment, the engagement with opposite sides of member 17' of guide rod 6 and auxiliary guide member 18, steadies the hole cutting bit 14, and the extension 19 insures that such steadying influence continues as the cut is advanced to the point that auxiliary guide member 18 leaves the surface of the member 17'. Alternatively, auxiliary guide member 18 may be fastened to guide rod 6 by means of screw 20 at a greater angle relative to the line joining the centers of guide rods 6, so as to accommodate a range of thicknesses of members 17', being rotated to engagement with the opposite sides of member 17' in a manner similar to that previously described. Moreover, for convenience, auxiliary guide members 18 may be secured to both guide rods 6 and used in a manner similar to those previously described, the ends of said auxiliary guide members 18 with extensions 19 being spaced to accommodate a range of thicknesses of members 17', and being rotatable as previously described to engage opposite sides of said members 17' thereby to steady the hole cutting bit 14 and the electric drill 2.

While I have shown the best embodiments of my invention now known to me, I do not wish to be limited to the exact structures shown and described herein, but may use such modifications or equivalents as are embraced within the scope of the specification or as pointed out in the claims.

I claim:
1. Apparatus to cut a member, comprising:
 (a) a rotatable hole saw means,
 (b) a pair of guide rods associated with said hole saw means extending parallel to the axis of rotation of said hole saw means in advance of the direction of travel of said hole saw means as said hole saw means is advanced into said member, (c) said guide rods being spaced from each other by a distance greater than the thickness of the member, (d) said guide rods being rotatable as a pair about the axis of rotation of said rotatable hole saw means into engagement with opposite sides of said member to steady said rotatable hole saw means.

2. Apparatus as in claim 1, said guide rods being adapted to slide along in engagement with opposite sides of said member as the rotatable hole saw means is advanced into said member.

3. Apparatus as in claim 1, further including:

(e) extension rods telescopically mounted to said guide rods and adjustable relative thereto.

4. Apparatus as in claim 3, said guide rods and extension rods being adapted to slide along in engagement with opposite sides of said member as the rotatable hole saw means is advanced into said member.

5. Apparatus as in claim 1, further including:

(e) an auxiliary guide member secured to one of said guide rods and extending generally towards the other of said guide rods.

6. Apparatus as in claim 5, further including:

(f) a rearwardly extending portion on that end of said auxiliary guide member adjacent the other guide rod, said rearwardly extending portion extending to a point behind the cutting edge of said rotatable hole saw means.

7. Apparatus for cutting a member, comprising:

(a) a hole saw, (b) a frame rotatably mounting said hole saw, (c) a pair of guide rods secured to said frame on opposite sides of said hole saw, said guide rods extending in a direction parallel to the axis of rotation of said hole saw, said guide rods also extending in advance of the direction of travel of said hole saw as said hole saw is advanced into said member, said guide rods being adapted to straddle said member, (d) said guide rods being rotatable as a pair about the axis of rotation of said hole saw into engagement with opposite sides of said member to steady said hole saw.

8. Apparatus as in claim 7, said guide rods being adapted to slide along in engagement with opposite sides of said member as said hole saw is advanced into said member.

9. Apparatus as in claim 7, further including:

(e) extension rods adjustably secured to said guide rods in a direction parallel to the axes of said guide rods.

10. Apparatus as in claim 7, further including:

(e) an auxiliary guide member secured to the forward end of one of said guide rods and extending generally towards the other of said guide rods.

11. Apparatus as in claim 10, further including:

(f) a rearwardly extending portion on that end of said auxiliary guide member nearest the other guide rod, said rearwardly extending portion extending to a point behind the cutting edge of said hole saw.

12. Apparatus for cutting a member, comprising:

(a) a hole saw, (b) a rotating apparatus for rotating said hole saw, (c) a pair of guide rods on opposite sides of said hole saw, said guide rods extending in a direction parallel to the axis of rotation of said hole saw, said guide rods also extending in advance of the direction of travel of said hole saw as said hole saw is advanced into said member, said guide rods being adapted to straddle said member, (d) mounting means to secure said guide rods to said rotating apparatus, (e) said guide rods and mounting means being rotatable about the axis of rotation of said hole saw into engagement with opposite sides of said member to steady said hole saw and rotating apparatus.

13. Apparatus as in claim 12, further including:

(f) a tapered portion on said hole saw, (g) a tapered seat in said mounting means complementary to and rotatably receiving said tapered portion of said hole saw.

14. Apparatus as in claim 12, further including:

(f) cover means, (g) collar means secured to said cover means and reciprocable along said guide rods, (h) handle means secured to said cover means to reciprocate said cover means and to support the forward end of guide rods.

15. Apparatus as in claim 14, further including:

(i) extension rods telescopically secured to said guide rods and adjustable in a direction parallel to the axes of said guide rods, (j) stop means secured to the forward ends of said extension rods and engageable with said cover means.

16. Apparatus as in claim 12, further including:

(f) a longitudinally fluted cutting portion on said hole saw rearwardly of the forward end thereof and adapted to smooth the cut surface of said member.

17. Apparatus to cut a member, comprising:

(a) a hole saw, (b) a rotating apparatus for rotating said hole saw, (c) a pair of guide rods on opposite sides of said hole saw, said guide rods extending in a direction parallel to the axis of rotation of said hole saw, said guide rods also extending in advance of the direction of travel of said hole saw as said hole is advanced into said member, said guide rods being adapted to straddle said member, (d) mounting means to secure said guide rods to said rotating apparatus, (e) an auxiliary guide member secured to the forward end of one of said guide rods and extending generally towards the other of said guide rods, (f) a rearwardly extending portion on that end of said auxiliary guide member nearest the other guide rod, said rearwardly extending portion extending to a point behind the cutting edge of said hole saw, (g) said auxiliary guide member and said other guide rod and said mounting means being rotatable to engage said auxiliary guide member and said other guide rod into engagement with opposite sides of said member to steady said hole saw and said rotating apparatus.

References Cited in the file of this patent

UNITED STATES PATENTS

| 2,437,668 | Adams | Mar. 16, 1948 |
| 2,662,562 | Lindell | Dec. 13, 1953 |

FOREIGN PATENTS

| 263,882 | Germany | Sept. 13, 1913 |
| 663,800 | Germany | Aug. 10, 1938 |